United States Patent [19]

Madsen

[11] 4,221,238
[45] Sep. 9, 1980

[54] LINEARLY OPERABLE INTERMITTENT VALVE

[75] Inventor: Lamar Madsen, Vernonia, Oreg.

[73] Assignee: Forest Medical Products, Inc., Forest Grove, Oreg.

[21] Appl. No.: 922,532

[22] Filed: Jul. 7, 1978

[51] Int. Cl.³ ........................................ F16K 31/524
[52] U.S. Cl. .................................. 137/627.5; 251/230
[58] Field of Search ............ 251/230, 122, 100, 182, 251/251; 74/128; 137/614.19, 627.5

[56] References Cited

U.S. PATENT DOCUMENTS

| | | | |
|---|---|---|---|
| 1,765,377 | 6/1930 | Marks | 251/230 |
| 2,412,613 | 12/1946 | Grant, Jr. | 137/627.5 |
| 3,026,908 | 3/1962 | Blair | 137/627.5 |
| 3,333,815 | 8/1967 | Downey et al. | 251/230 |
| 3,870,275 | 3/1975 | Kallel | 251/215 |
| 4,067,358 | 1/1978 | Streich | 251/230 |
| 4,116,216 | 9/1978 | Rosenberg | 137/624.18 |
| 4,134,418 | 1/1979 | Woodcock | 137/627.5 |

Primary Examiner—Martin P. Schwadron
Assistant Examiner—A. Michael Chambers
Attorney, Agent, or Firm—Chernoff & Vilhauer

[57] ABSTRACT

A valve for alternately interrupting and permitting fluid flow is comprised of a cylindrical valve body having medial inlet and outlet chambers which are interconnected by a flow restricting orifice. An inlet enters into the inlet chamber, which opens out of the lower end of the valve body, and an outlet enters into the outlet chamber, which opens out of the upper end of the valve body. A poppet, which slidably fits within the inlet chamber, translates between a closed position wherein it prevents fluid flow through the orifice and an open position wherein flow is permitted, but is normally biased to its closed position by a spring. A plunger, which slidably fits within the outlet cavity, has a reduced diameter extension which extends through the orifice into contact with the poppet so that depression of the plunger causes the poppet to be moved to its open position and, unless otherwise restrained, release of the plunger would cause the poppet to be moved to its closed position. However, a cam, which is located in the valve body, is operably associated with the plunger to limit its travel in a manner such that repeated depression and release of the plunger causes it to be placed alternately in either a raised position, out of contact with the poppet, or in a lowered position, which places the poppet in its open position. Accordingly, the valve intermittently opens and closes as the plunger is repeatedly depressed and released.

1 Claim, 6 Drawing Figures

U.S. Patent    Sep. 9, 1980    4,221,238
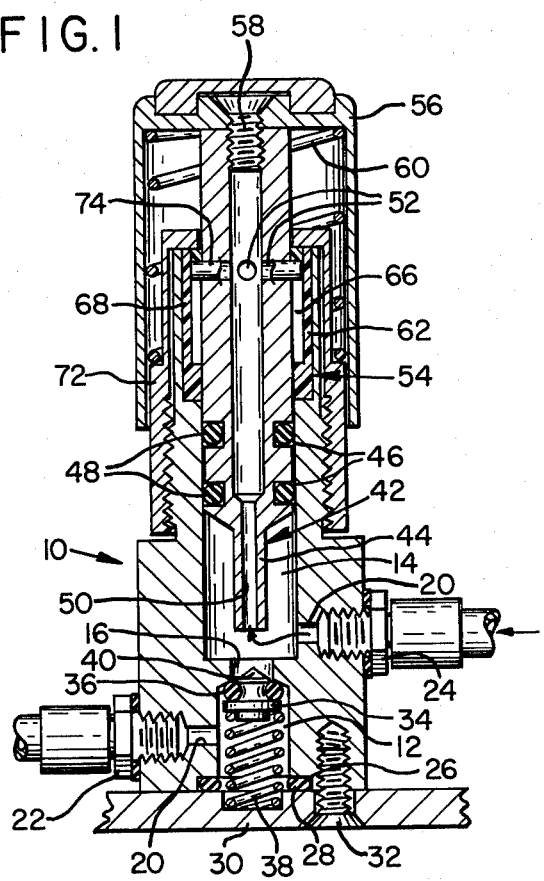
FIG.1
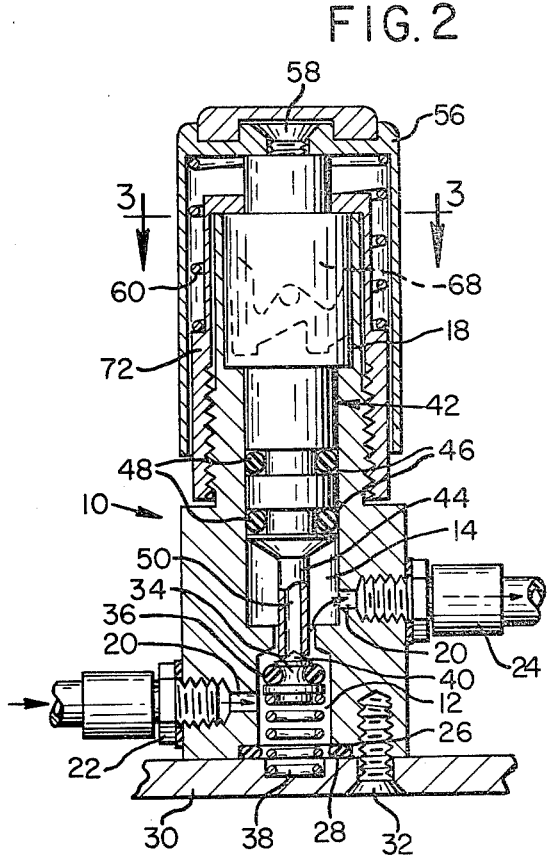
FIG.2
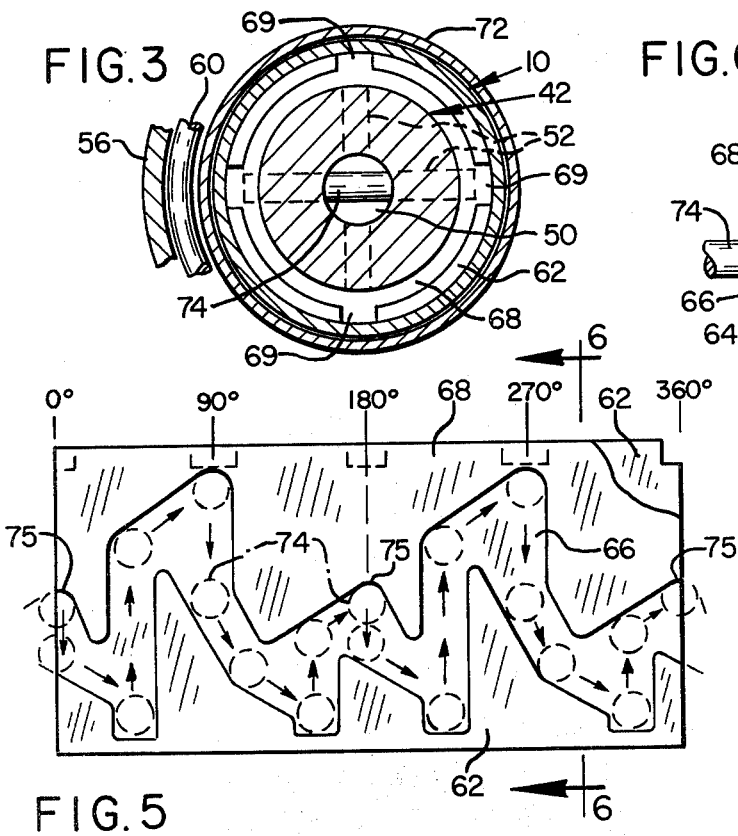
FIG.3
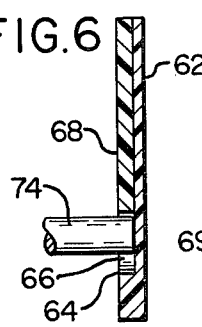
FIG.6
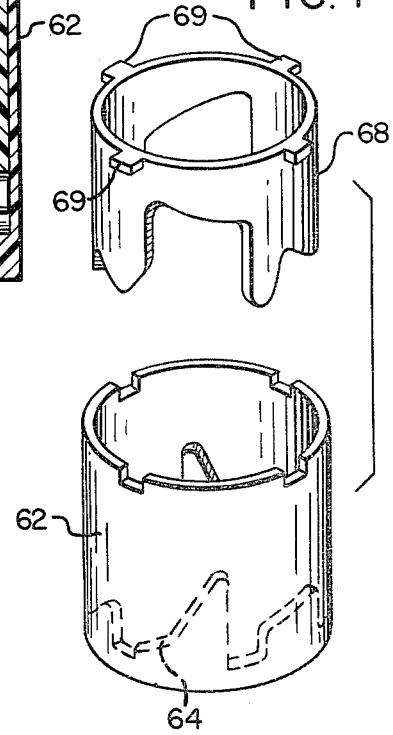
FIG.4
FIG.5

LINEARLY OPERABLE INTERMITTENT VALVE

BACKGROUND OF THE INVENTION

In industrial valve operations where there is a requirement for frequent intermittent flow with the added requirement that the user is not required to physically hold the valve in either the open or closed position, a standard toggle valve typically is used. However, in certain instances, such as controls for air driven rotary dental equipment, the valve must be controlled blind by the user's foot, and in this circumstance a toggle valve is difficult to actuate and, therefore, diverts the user's attention from the tool being controlled by the valve. However, a linearly operable intermittent valve which is of simplified operation has not heretofore been known.

While prior art solonoid operated valves give the aforementioned control advantages, they are quite bulky and complex and, therefore, expensive and unwieldy to use. In addition, as the electrical contacts become dirty over a period of time, the valves are not completely reliable which, in the case of dental equipment for example, can have undesirable effects. Therefore, even in light of the above described limitations, toggle valves are still used in applications of this type due to their straight forward reliable operation.

SUMMARY OF THE INVENTION

The valve of the present invention includes a cylindrical valve body which mounts the other operative elements of the invention. Located within the valve body is a medial cavity which is divided into an upper outlet chamber and a lower inlet chamber by a restrictive orifice. In the embodiment illustrated the outlet chamber is longer and has a larger diameter than the inlet chamber, and the chambers respectively open out of the top and bottom of the valve body.

A poppet, which is located in the inlet chamber, is movable between a closed position, where it prevents flow through the orifice, and an open position, where flow is allowed. A spring, located in the inlet chamber below the poppet, normally biases the poppet to its closed position and is seated in a plate which covers the bottom of the inlet cavity. A conical tip located on the top of the poppet extends into the orifice when the poppet is in its closed position but does not entirely close it, so as to provide smooth flow characteristics when the valve is being opened and closed.

A plunger, which slidably fits in the outlet cavity and extends outwardly above the valve body, has a reduced diameter extension which is arranged to fit through the orifice when the plunger is depressed. Therefore, when the plunger is depressed the poppet is moved to its open position, and when the plunger is released the poppet would normally return to its closed position. However, cam means associated with the plunger control its longitudinal position so that in operation release of the plunger will not necessarily cause the poppet to be returned to its closed position.

The cam means comprises a hollow cylindrical guide sleeve which defines the bottom surface of a track on its inner face, and which fits into the seat at the top of the outlet chamber. A hollow cylindrical plunger guide fits within the guide sleeve and has an irregularly shaped lower margin which defines the top surface of the track. A keeper pin, which extends from each side of the plunger, fits into the track formed by the plunger guide and guide sleeve so that the vertical position of the plunger is determined by the track.

The track is shaped such that when the plunger is depressed, with the valve in its open position, the pin is rotated and translated to a position near the bottom of the cam. When the plunger is released, the pin then is free to raise upwardly and while rising it is again rotated until it lies in a pocket of the track near the top of the cam, thereby placing the valve in its closed position. A second depression and release causes further rotation and vertical translation of the pin until it lies in another pocket midway in the cam, to again lock the valve in its open position. The pattern of the track repeats so that successive depressions and releases of the plunger alternately opens and closes the valve.

The cam is retained in the valve body by a guide retainer, and the plunger is enclosed by a cover which, along with the plunger, is normally urged upwardly away from the poppet by a spring.

Accordingly, it is a principal object of the present invention to provide a valve of the class described which is intermittently opened and closed upon repeated depression and release.

It is a further object of the present invention to provide such valve which operates in a positive straight forward manner for trouble free repetitive results.

It is a further object of the present invention to provide such a valve which is of simplified design for inexpensive manufacture and long life.

The foregoing objectives, features and advantages of the present invention will be more readily understood upon consideration of the following detailed description of the invention taken in conjunction with the accompanying drawings.

BRIEF DESCRIPTION OF THE DRAWINGS

FIG. 1 is a cross sectional view of a valve embodying the features of the present invention, shown in its closed position.

FIG. 2 is a cross sectional view of the valve of FIG. 1 in its open position.

FIG. 3 is a fragmentary sectional view, taken on the line 3—3 of FIG. 1.

FIG. 4 is an exploded pictorial view of the cam elements, which are a component of the valve.

FIG. 5 is a plan view of a layout of the pattern of the cam elements of FIG. 4.

FIG. 6 is a cross sectional view taken on the line 6—6 of FIG. 5.

DETAILED DESCRIPTION OF A PREFERRED EMBODIMENT

Referring to FIGS. 1 and 2 of the drawings, the valve of the present invention comprises a valve body 10, which is shown as being cylindrical in the embodiment illustrated. Passing longitudinally through the entire extent of the valve body is a medial cavity which is divided into a lower inlet chamber 12 and an upper outlet chamber 14 that are separated from each other by a restrictive orifice 16. In the embodiment illustrated the inlet chamber is considerably shorter and has a smaller diameter than the outlet chamber and the upper portion of the outlet chamber is relieved to provide a larger diameter seat 18. Threaded bores 20, passing into each chamber from outside of the valve body, are arranged to respectively receive an inlet tube and fitting 22 and an outlet tube and fitting 24. The lower extremity of the inlet chamber includes an annular O-ring groove 26 which receives an O-ring 28 for sealing between the inlet chamber and the valve bottom plate 30 which is releasably attached to the valve body by means of screws 32.

Located in the inlet chamber is a poppet 34 which is movable between a closed position, FIG. 1, wherein it prevents flow through the orifice 16, and an open position, FIG. 2, wherein it is lowered away from the orifice and permits flow therethrough. An O-ring 36 is attached to the upper end of the poppet to provide an effective seal and poppet biasing means, such as a spring 38, urges the poppet upwardly so that it is normally in its closed position. The upper extremity of the poppet has a conical tip 40 which projects into the orifice 16 when the poppet is in its closed position but does not completely seal it.

A plunger 42, which slidably fits within the outlet chamber 14, is utilized to move the poppet between its open and closed positions. To this end the plunger has a reduced diameter extension 44 which is sized to freely pass through the orifice 16 into contact with the poppet 34. Thus, unless otherwise restricted, the poppet can be moved between its open and closed positions by repeated depression and release of the plunger.

The plunger has paired O-ring grooves 46 which contain O-rings 48 to seal the plunger in the outlet cavity, and a central bleed passageway 50 passes longitudinally through the plunger. Normally opposed keeper pin holes 52 pass longitudinally through the plunger intermediate its ends and intersect the passageway 50. Operably associated with the plunger are cam means 54 which control the longitudinal position of the plunger in the valve body in a manner such that repeated activation of the plunger causes the poppet to alternate between its open and closed position, thereby providing intermittent valve operation.

To assist the cam means in accomplishing this end, the upper extremity of the plunger 42 extends outwardly from the top of the valve body and is covered by a cylindrical cover 56 which is attached to it by means of a screw 58. Plunger biasing means, such as spring 60, interfits between the cover 56 and the valve body 10 to urge the former element upwardly with respect to the latter element.

The operative element of the cam means is a cam element, FIG. 4, which includes a hollow cylindrical guide sleeve 62 having an outside diameter to snugly fit within the seat 18 at the top of the outlet chamber of the valve body, and a length which is equal to the height of seat 18. Extending about the periphery of the inner surface of the guide sleeve is an irregularly shaped ledge 64 which defines the lower surface of a track 66, FIG. 5. Thus the inside diameter of the guide sleeve above ledge 64 is greater than below the ledge.

The other portion of the cam element is a plunger guide 68, which has an outside diameter equal to the inside diameter of the guide sleeve above ledge 64, and an inside diameter equal to the inside diameter of the guide sleeve below ledge 64. The lower margin of the plunger guide is irregular and forms the upper surface of track 66. Located at the upper edge of the plunger guide are outwardly extending tabs 69 which fit within mating slots 70 located in the top margin of the guide sleeve. Accordingly, when the plunger guide is inserted into the guide sleeve with tabs 69 positioned in slots 70, the two elements cannot rotate relative to one another and cannot translate with respect to one another in one longitudinal direction. The plunger guide and guide sleeve are prevented from translating with respect to one another in the other longitudinal direction and are fixed in seat 18 by means of an inverted U-shaped guide retainer 72 which is releasably attached to the valve body. The plunger then is operably associated with the cam element by means of a cam fullover means, such as a keeper pin 74 which passes through one of the holes 52 and extends outwardly from each side of the plunger into opposed portions of track 66, FIG. 6.

Operation

In use the valve is fixed in either an open position, FIG. 2, to pass flow from the inlet 22 to the outlet 24, or in a closed position, FIG. 1. When it is in the closed position, the air in the outlet line is automatically bled through passageway 50 as shown by the arrows. To change the valve from its open to its closed position or vice versa the user need only depress and then release the cover 56, with respective depression and releases causing the valve to repeatedly alternate between its open and closed positions.

Referring to FIG. 5, starting with the valve in its closed position, the opposed ends of keeper pin 74 are located in track 66 at the 90° and 270° positions so that the pin, and thus the plunger 42, are urged to their upper most position by spring 60. As the cover, and thus the plunger, is depressed, the pin is urged downwardly until it strikes the lower surface of track 66 whereupon it is urged to the right, as shown in FIG. 5, thereby causing the plunger to rotate counterclockwise, until the pin reaches the lowermost part of the track. As the plunger is depressed, extension 44 comes into contact with poppet 40 and urges it downwardly against spring 38, thereby opening orifice 16 between inlet chamber 16 and outlet chamber 14 to let fluid flow past from inlet 22 to outlet 24.

As the user releases the cover, springs 38 and 60 cooperate to raise poppet 40 and plunger 42 in unison. However, as the plunger is raised, pin 74 comes into contact with the upper surface of the track thereby causing the plunger again to rotate counterclockwise as it is raised, until the ends of the pin reach the hump 75 at the 0° and 180° positions in the track 66 to prevent further upward release of the plunger before the valve becomes closed, as shown in FIG. 2. Accordingly, the valve remains in the open position even though the user has released it.

To reclose the valve the user again depresses the cover, and the plunger, causing the pin again to move downwardly until it strikes the lower surface of track 66 and then move to the right to rotate the plunger further in a counterclockwise direction. Thus when the plunger is released again, the pin rises to its topmost position in the track thereby raising the extension 44 away from contact with the poppet to close the valve.

It will be noted that when the valve is closed any fluid trapped in outlet chamber 14 and outlet line 24 is bled back through passageway 50 out of the valve. However, when the valve is in its open position, the conical tip 40 of the poppet extends into the passageway to seal it. Also, the conical shape of tip 40 smooths out the flow characteristics of the valve upon opening and closing.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:
1. A valve for interrupting fluid flow comprising:
   (a) a valve body defining a cavity therein, said cavity being separated into an inlet chamber and an outlet chamber which are interconnected by a restrictive orifice, said outlet chamber opening out of said valve body and having an expanded diameter seat defined in the upper portion thereof;
   (b) inlet means passing through said valve body into said inlet chamber and outlet means passing through said body into said outlet chamber;
   (c) a poppet dimensioned to slidably fit within said inlet chamber and movable between a closed position wherein it prevents fluid flow to said orifice, and an open position wherein said flow is unrestricted, including poppet biasing means for normally urging said poppet to its closed position;
   (d) reciprocative plunger means slidably mounted within said cavity and associated with said poppet for moving said poppet between said open and closed positions, wherein said plunger slidably fits partially within said outlet chamber and partially extends outwardly therefrom, and includes a reduced diameter extension which passes through said orifice into contact with said poppet when said plunger is depressed in said valve body, and has a central bleed passageway which passes from the distal extremity of said extension through said plunger;
   (e) said poppet having a conical tip arranged to seal said passageway when said extension comes into contact with said poppet;
   (f) plunger biasing means associated with said plunger for urging it outwardly in said outer chamber;
   (g) cam means operably associated with said plunger means so that repeated activation of said plunger means causes said poppet to alternate between said open position and said closed position, said cam means comprising:
      (1) a hollow cylindrical cam element, arranged to fit within said seat,
      (2) said cam element including a circuitous track which extends about its inner periphery and which is defined by upper and lower surfaces of a recessed groove located in said cam element, said track comprising a first vertical leg, wherein said upper and lower surfaces are vertical and parallel to one another, which extends from near the bottom of said cam element upwardly to a first predetermined point on said cam element, said first vertical leg being followed by a first upwardly sloped leg, wherein said upper surface slopes upwardly from said first predetermined point, which terminates at a second predetermined point on said cam element, said second predetermined point lying above said first predetermined point, said first upwardly sloped leg being followed by a second vertical leg, wherein said upper surface extends vertically, which terminates at a third predetermined point intermediate said second predetermined point and the bottom of said cam element, said second vertical leg being followed by a first downwardly sloped leg, wherein said lower surface slopes downwardly from said third predetermined point, which terminates at a fourth predetermined point lying near the bottom of said cam element, said first downwardly sloped leg being followed by a third vertical leg, wherein said lower surface is vertical, which terminates at a fifth predetermined point intermediate said third and fourth predetermined points, said third vertical leg being followed by a second upwardly sloped leg, wherein said upper surface slopes upwardly from said fifth predetermined point, which terminates at a sixth predetermined point which lies below said second predetermined point, said second upwardly sloped leg being followed by a second downwardly sloped leg, wherein said lower surface slopes downwardly from said sixth predetermined position, which terminates at the bottom end of said first vertical leg;
      (3) retention means for securing said cam element within said valve housing; and
      (4) cam follower means joined to said plunger for engagement with said track;
   (h) cover means associated with said plunger means for activating said plunger means merely by application of a linear downward force on said cover means.

* * * * *